Dec. 7, 1948.  A. J. NEWMAN  2,455,874
MACHINE FOR TESTING AND MARKING PARTS MAGNETICALLY
Filed April 7, 1944  4 Sheets-Sheet 1

INVENTOR.
ALBERT J. NEWMAN
BY
ATTORNEY

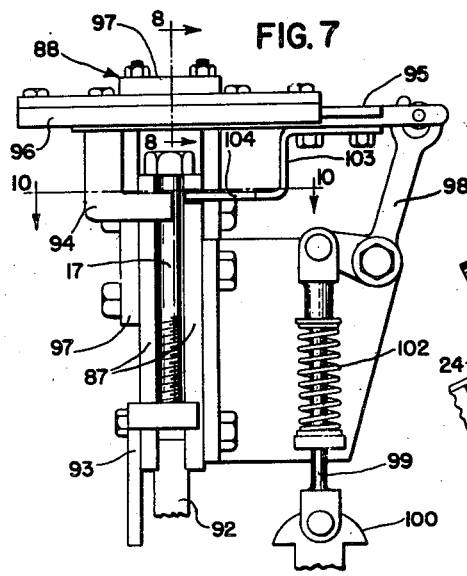

Dec. 7, 1948.  A. J. NEWMAN  2,455,874
MACHINE FOR TESTING AND MARKING PARTS MAGNETICALLY
Filed April 7, 1944  4 Sheets-Sheet 3
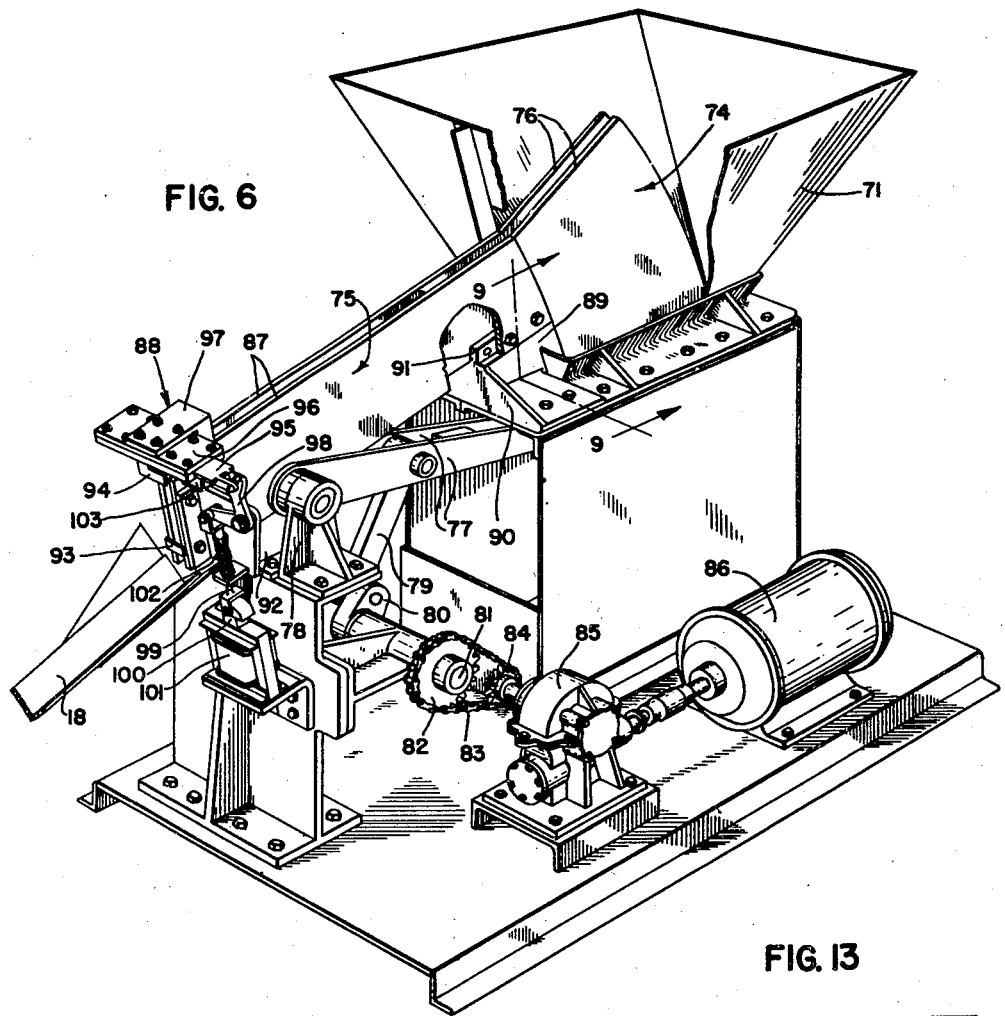
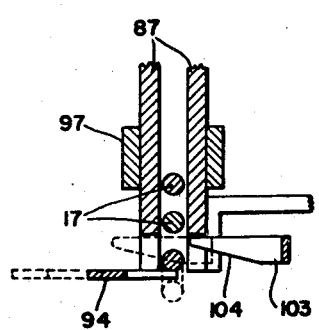
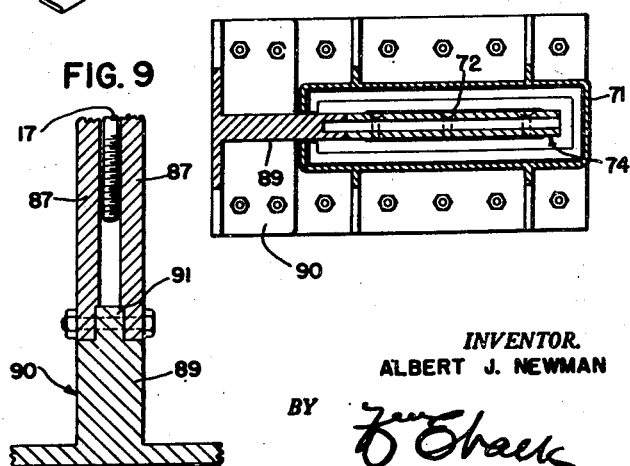
INVENTOR.
ALBERT J. NEWMAN
BY
ATTORNEY

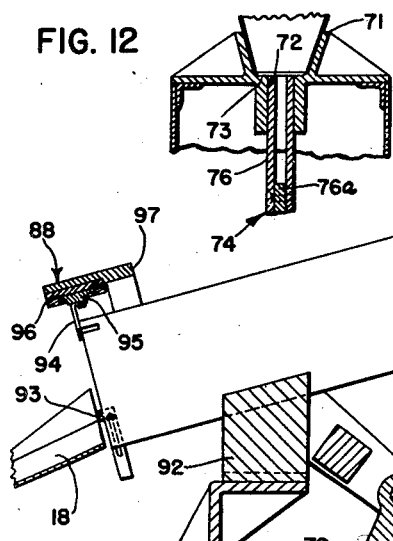
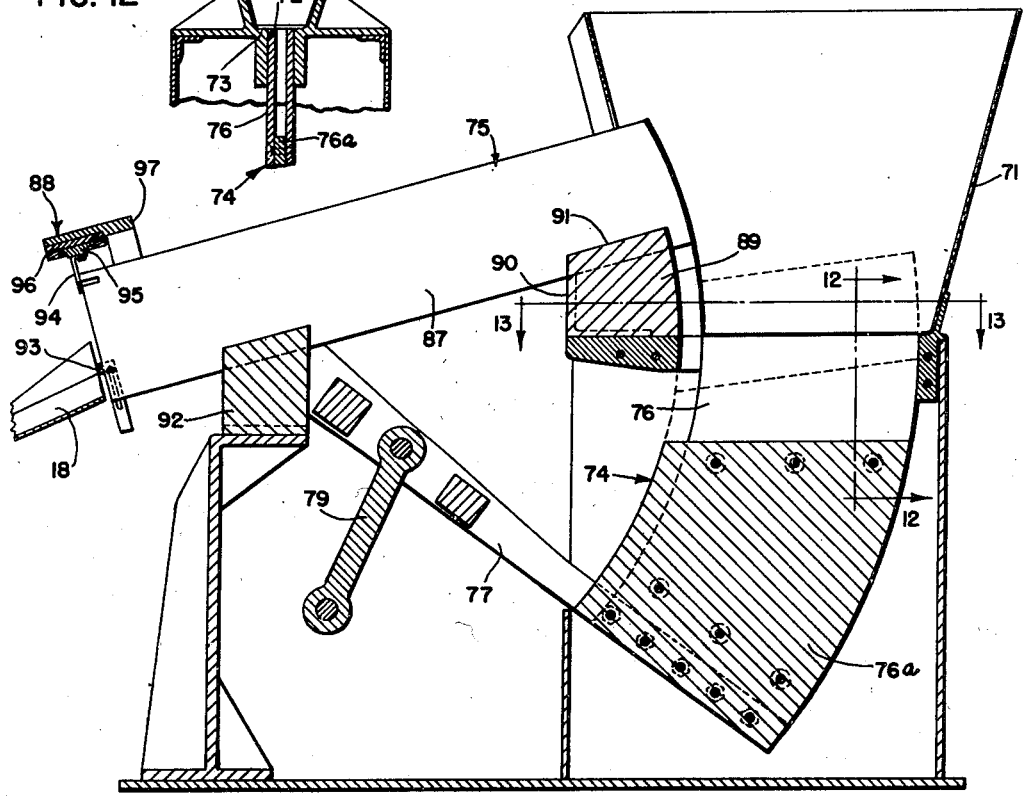
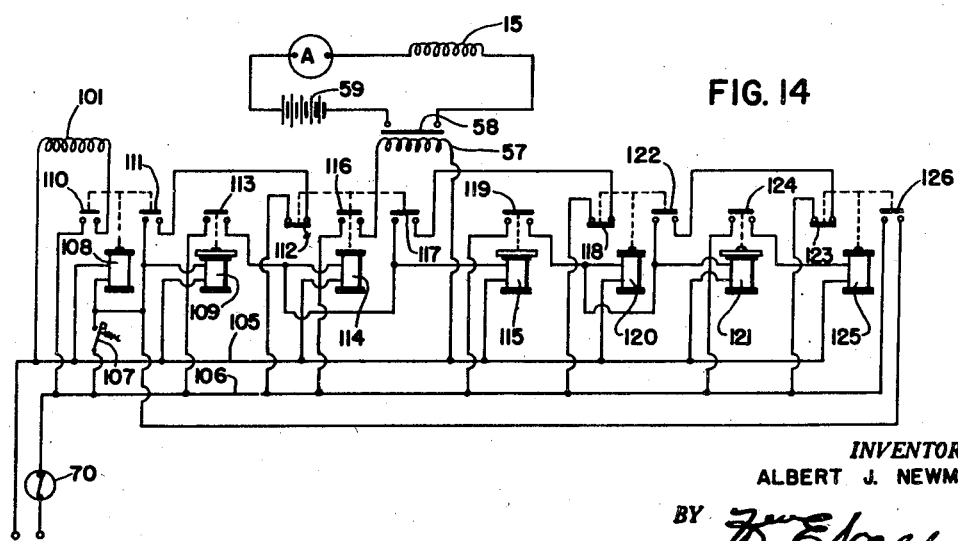

Patented Dec. 7, 1948

2,455,874

UNITED STATES PATENT OFFICE 2,455,874

MACHINE FOR TESTING AND MARKING PARTS MAGNETICALLY

Albert J. Newman, Kenmore, N. Y., assignor to Curtiss-Wright Corporation, a corporation of Delaware Application April 7, 1944, Serial No. 530,020

8 Claims. (Cl. 175—183)

This invention relates to improvements in machines for testing machine and structural parts and for marking any of such parts as are defective or have faults which may render them unsafe or otherwise unsuitable for the purpose for which they are intended; and more particularly the invention is concerned with a machine which is adapted to apply a magnetically sensitive film to each part and then to set up a magnetic field about the part, whereby to modify the film in such a manner that any faults which are present in the part will be indicated.

The machine is characterized by a magnetizing coil through which the parts to be tested are directed, and in which they are momentarily held, after a magnetically sensitive film has been applied to them. Each part, being a conductor, will be traversed by lines of force of the magnetic field. As to any parts which are free of faults or of substantially uniform grain structure, the lines of force through the parts will be uninterrupted and hence the film on the parts will be unaffected by the magnetic field. If, however, there are any faults in the form of cracks, holes, pockets of slag, or poor grain structure, the high flux leakage which will occur at these points will be evidenced by concentrations of the particles of the magnetically sensitive film around the areas in which the faults are located, the degree of concentration of the rearranged film particles and the configurations of the concentrations indicating the nature and extent of such faults. After the parts are subjected to the action of the magnetic field, they are discharged from the coil so that they may be inspected and the proper disposition made of them as indicated by such inspection.

One object of the invention is to provide a machine of the character generally described which will mark the parts clearly and accurately to indicate the location, extent and nature of any defects or faults.

A further object is to provide a machine which will test parts of various sizes and shapes.

A still further object is to provide a machine which is adapted to test the parts rapidly without damage either to them or to the machine.

A still further object is to provide a machine which may be adjusted with facility to regulate, at will, the speed at which the testing operations are performed.

A still further object is a novel design and arrangement of the parts of the machine, whereby to provide a machine which is automatic in operation and simple and compact in construction.

The invention is illustrated in the accompanying drawings in which:

Figure 4 is a side elevation of the magnetizing coil.

Figure 5 is a wiring diagram of the electric circuit for controlling the operation of the machine.

Figure 6 is a perspective view of a mechanism for automatically feeding the parts to be tested.

Figure 7 is an enlarged end view of the feed mechanism shown in Figure 6.

Figure 8 is a detail section taken along line 8—8 of Figure 7.

Figure 9 is an enlarged fragmentary section taken along line 9—9 of Figure 6.

Figure 10 is a detail section taken along line 10—10 of Figure 7.

Figure 11 is a vertical section through the mechanism for feeding the parts to be tested.

Figure 12 is a fragmentary sectional view taken along line 12—12 of Figure 11.

Figure 13 is a sectional view taken along line 13—13 of Figure 11, the magazine loader being shown in full lines in a position corresponding to the dotted-line position indicated in Figure 11.

Figure 14 is a wiring diagram of the electric circuit for controlling the operation of the machine when the automatic feeding mechanism is employed.

Figures 1, 2, 3:
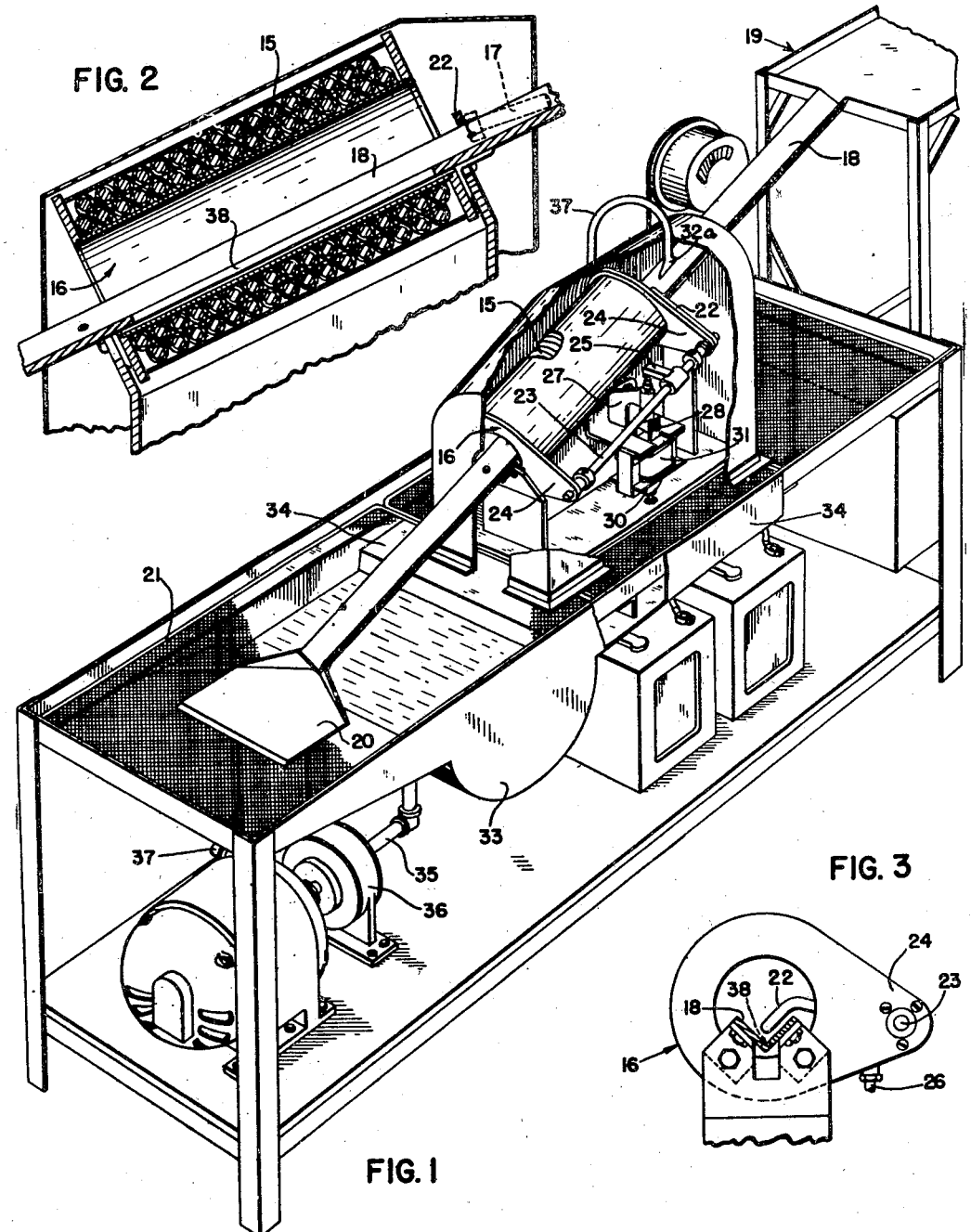
Figure 1 is a perspective view of a machine in which the features of the invention are incorporated.
Figure 2 is a longitudinal section through the magnetizing coil.
Figure 3 is an end view of the magnetizing coil.

The machine, as illustrated, includes a magnetizing coil 15 which is wound on a spool 16, the internal diameter of said coil being large enough to permit the passage therethrough of bolts 17, or other parts to be tested. A chute 18 of non-magnetic material directs the bolts lengthwise through the magnetizing coil, the latter and the chute preferably being arranged at such an angle that the bolts will slide down the chute by gravity. At its upper end the chute is supported by the side of a table 19 on which the parts to be tested are initially placed, the lower end of the chute terminating in a spreader plate 20 on which the parts which have been tested come to rest or by which they are directed onto a screen 21. In this connection it will be noted (see Figure 2) that in their passage through the magnetizing coil the parts pass in close proximity to the lower wall of the coil. This is desirable for two reasons. It enables maximum utilization of the magnetic field set up by the coil; and it reduces to a minimum the size of the coil with respect to the size of the parts to be tested.

The parts to be tested may be placed in the chute 18 at the upper side of the magnetizing coil by the operator. They slide down the chute until arrested by a finger 22 which is normally located in the path of the parts and hence which will normally prevent the latter from entering the coil. The finger 22 is carried by a rock shaft 23. The latter is journaled in arms 24 which form the ends of the spool on which the magnetizing coil is wound and carries an arm 25. The outer end of the arm 25 overlies a stem 26 which occupies a bore in a guide bracket 27 and which, at its lower end, is pivotally connected by a pin 28 to extensions 29 of the armature 30 of a solenoid 31. An adjustable screw 32 (Figure 4), which provides a seat for the armature when the solenoid is deenergized, supports the armature in a position corresponding to the lowered, or operative, position of the finger 22, the latter in such lowered position being engageable with the heads of the bolts 17 as the latter slide head foremost down the chute 18 but being held in such relation to the bottom walls of the chute that when elevated to release the head of the engaged bolt and then permitted to return immediately to its operative position, its tip will clear the shank of the bolt. In other words in its operative position the finger 22 extends into the chute far enough to engage the heads of the bolts, but not their shanks.

When the parts to be tested come to rest in front of the magnetizing coil 15, they are located under a nozzle 32a and are sprayed with a magnetically sensitive material in suspension. A body of the suspension, which may consist of iron oxide, a dispersing agent and a liquid in which the iron oxide is in suspension is maintained in a sump 33. The latter is a part of, and is carried by, a drainage pan 34. The suspension is withdrawn from the sump 33 through an intake pipe 35 by a motor-driven pump 36 and directed through a conduit 37 to the nozzle 32a. The suspension withdrawn from the sump and sprayed upon the parts to be tested is in the form of a continuous discharge, the excess suspension draining back into the pan 34. A film of magnetically sensitive material is, therefore, applied to each part as the latter pauses below the nozzle 32a and just prior to the time the finger 22 is elevated to permit it to enter the magnetizing coil 15.

The finger 22 is lifted momentarily at predetermined intervals to permit the articles to be tested to enter the magnetizing coil, the said finger being lifted by energization of the solenoid 31 and, when the parts being tested are bolts, being held elevated only long enough to permit the head of the engaged bolt to pass beneath it. As noted, the finger 22 will not engage the shank of the bolt if it returns to its normal position before the shank passes completely beneath it. Hence the finger may be, and preferably is, returned to its normal position as soon as the head of the bolt passes beneath it. By controlling the finger 22 in this manner, any possibility of more than one bolt entering the magnetizing coil when the finger 22 is lifted is minimized.

Preferably the magnetizing coil 15 is deenergized at the time the part to be tested enters it, the circuit including the said coil being so controlled that it will be closed to energize the coil as the said part approaches a position in which its ends are substantially equally spaced with respect to the ends of the coil. The magnetic field which is immediately set up about the coil 15 is thereupon operative to arrest the part within the coil, the said part in this respect being influenced by the magnetic field in the same manner as an armature. At the same time a large number of the lines of force of the magnetic field set up by the coil traverse the part. Any fault in the part will, therefore, be clearly indicated, as it will permit a flux leakage which will cause a concentration of oxide particles along the edges of such fault. As the lines of force traversing the part are parallel to the axis of the latter, the machine is particularly effective in indicating those faults which are normal to the axis of the part. In connection with the foregoing, it will be noted that as of the time the part to be tested is magnetized in the manner described the film which coats it is in a highly fluid state and hence will permit free movement of the oxide particles over the surface of the part under the influence of the magnetic field set up by the coil. Accurate indications of any faults which may be present in the part are, therefore, insured. In order to prevent washing away of the indications thus obtained by the excess solution, a slot 38 (Figure 2) is formed in the bottom of the chute 18 to permit the excess solution to escape from the chute and flow back into the drain pan 34.

After a part has been subjected to the action of the magnetizing coil for a period long enough to effect any necessary rearrangement of the iron oxide particles of the film, the coil is demagnetized. The break-down of the field of the coil releases the part and the latter continues down the chute onto the plate 20 while the finger 22 is lifted to permit the succeeding part to enter the coil. The bolts which come to rest on, or in the vicinity of, the plate 20 are examined and such disposition made of them as indicated to be proper by the condition of their coating.

An electric circuit for effecting the operation of the various mechanisms of the machine in the manner described is illustrated in Figure 5 of the drawings, alternating current supply lines for the said circuit being indicated at 39 and 40. A normally open switch 41 may be momentarily closed to connect relays 42 and 43 across the lines 39 and 40, the relay 42 closing switches 44 and 45. The former connects the solenoid 31 across the lines 39 and 40 while the switch 45 and a normally closed switch 46 establish a holding circuit for the relays 42 and 43. Upon being energized the solenoid 31 is operative, as has been noted, to elevate the finger 22 and permit a part which has been arrested by the finger to enter the magnetizing coil 15. The relay 43, which is delayed acting, is timed, when bolts are being tested, so that immediately the head of the engaged bolt passes beneath the finger 22, it is operative to close a switch 47. The latter connects relays 48 and 49 across the lines 39 and 40, the relay 48 being operative to open the switch 46 and thereby open the holding circuit of the relays 42 and 43 and to close a switch 50, the latter and a normally closed switch 51 establishing a holding circuit for the relays 48 and 49. The relay 49, which is delayed acting, is so timed that as the bolt, or other part, approaches a location in the magnetizing coil in which its ends are substantially equally spaced with respect to the ends of the coil, it is operative to close a switch 52 and thereby connect relays 53 and 54 across the lines 39 and 40. When the relay 53 is energized, it opens the switch 51 to break the holding circuit for the relays 48 and 41; and at the same time it closes switches 55 and 56, the former connecting a solenoid 57 across the lines 39 and 40 to close a switch 58 and thereby connect the magnetizing coil 15 across the terminals of a source 59 of direct current. The coil 15 is thereupon energized and the magnetic field set up by it is utilized to arrest the part located between its terminals and to modify for the purpose described the magnetically sensitive film with which the said part is coated. When the switch 56 is closed, it and a normally closed switch 60 establish a holding circuit for the relays 53 and 54. The latter, which is delayed acting, is operative after the magnetizing coil 15 has been energized for the proper length of time to close a switch 61 and thereby connect relays 62 and 63 across the lines 39 and 40. The relay 62 is thereupon operative to open the switch 60 to break the holding circuit for the relays 53 and 54 and thereby open the switch 58 to deenergize the magnetizing coil 15. At the same time the relay 62 closes a switch 64. The latter and a normally closed switch 65 establish a holding circuit for the relays 62 and 63. After a predetermined interval the relay 63, which is delayed acting, is operative to close a switch 66 and thereby connect a relay 67 across the lines 39 and 40. When energized the relay 67 opens the switch 65 to break the holding circuit for the relays 62 and 63, first, however, closing a switch 68 which with a line 69 connects the relays 42 and 43 across the lines 39 and 40 around the switch 41. The cycle of operations described, therefore, is started anew, being repeated until a normally closed switch 70 in the line 40 is opened. The interval between the time the magnetizing coil 15 is deenergized and the time the solenoid 31 is energized may, it will be noted, be varied by adjusting the timing of the relay 63.

The invention contemplates the automatic feeding of the parts to be tested to the chute 18, if this is desired and if the said parts are of a suitable shape. In the embodiment of the invention illustrated in Figure 6, the bolts to be tested are initially introduced into a hopper 71. The side walls of the latter are inclined toward one another in the direction of the bottom of the hopper so that as the bolts approach the bottom they are caused to assume an axial direction which corresponds to the directional extent of an elongated slot 72 in the bottom wall 73 (Figure 12) of the hopper. A loader 74 is operable in the slot 73, being adapted to transfer the bolts in the hopper to a magazine 75. Referring to Figure 11, it will be noted that the loader 74 includes cooperating side plates 76 which together with a spacing plate 76a are carried by and between the outer ends of arms 77, the said arms being spaced apart to accommodate the magazine 75 between them and each being supported for pivotal movement by a bracket 78. In order to oscillate the loader 74 between the upper and lower limits of its range of movement, a connecting rod 79 (Figure 6) is connected at its upper end to and between the arms 77 and at its lower end to a crank 80, the latter being carried by a shaft 81 which also carries a sprocket 82. A chain 83 connects the sprocket 82 to a drive sprocket 84 which is connected through the agency of a gear reduction unit 85 to a motor 86. The drive mechanism for the loader is so designed that at the lower limit of the latter the upper edges of the side plates 76 are substantially flush with the bottom wall 73 of the hopper, as best shown in Figure 12, while at the upper limit of the loader (Figure 6) the upper edges of the side plates provide continuations of parallel guide plates 87 of the magazine. In this connection it is to be noted that the side plates 76 of the loader extend above the spacing plate 76a a distance which is greater than the length of the shanks of the bolts and are spaced apart by the spacing plate so that the shanks of the bolts will readily enter between them. The spacing of the plates 76, however, is not great enough to permit entry of the heads of the bolts between them. Hence, as the loader moves toward its lower limit the shanks of certain of the bolts in the hopper will enter between the plates 76 and these bolts will assume a substantially upright position, being supported in such position by their heads which rest upon the upper edges of the plates 76. As the loader moves to the upper limit of its range of movement the upper portions of the plates 76 are moved into alignment with the guide plates 87 of the magazine. At the upper limit of its range of movement of the loader, the upper edges of the side plates 76 are inclined at such an angle that the bolts which are supported by their heads slide by gravity toward and enter the magazine 75.

The guide plates 87 of the magazine also support the bolts by their heads and are inclined so that the bolts which enter between them will slide by gravity toward an ejector mechanism 88 which is located at the lower end of the magazine. At their upper end the plates 87 are supported in the desired spaced relation by a vertical wall 89 of a bracket 90, a tongue 91 (Figure 9) on the upper edge of the said wall spacing the guide plates 87 a distance apart corresponding to the spacing of the side plates of the loader. At their lower ends the guide plates may be carried by a similar mounting bracket 92.

The ejector mechanism 88 is adapted at predetermined intervals to discharge bolts from the magazine 75 into the chute 18 so that after a magnetically sensitive film has been applied to them they may be caused to enter the magnetizing coil 15 and be tested in the manner described. To this end the said mechanism includes a fixed lower stop 93 (Figures 6 and 7) which extends across the ends of the plates 87 of the magazine and a movable upper stop which also extends across the ends of the said plates, the fixed stop being adapted to engage the lower end of the shank of the leading bolt in the magazine while the upper stop is adapted to engage the shank of the same bolt just below the head. The upper stop 94 is carried by a slide 95, a guide 96 therefor being supported upon the guide plates 87 by a suitable bracket 97. At its outer end the slide 95 is connected to one arm of a bellcrank 98, the other arm of the said bellcrank being connected by a rod 99 to the armature 100 of a solenoid 101, a spring 102 which is arranged upon the rod 99 normally acting upon the bellcrank to hold the latter in a position corresponding to the retracted position of the slide 95, i. e., the position in which the stop 94 engages the shank of the leading bolt in the magazine 75.

The discharge of a bolt from the magazine is effected by energizing the solenoid 101. Thereupon the bellcrank 98 is actuated to move the stop 94 to one side of, and out of engagement with, the leading bolt in the magazine. The slide 95 also carries an ejecter finger 103. The latter is located at the opposite side of the magazine with respect to the stop 94 and is formed with a tip which is adapted to enter between the shank of the leading bolt and the shank of the following bolt, as best shown in Figure 10, the leading edge of the tip of the finger being formed with an inclined edge 104. The stop 94 and ejector finger 103 are supported so that as the slide is advanced to move the stop out of the way the inclined edge of the ejector finger strikes the shank of the leading bolt just below the head of the latter. The bolt is thereby thrown head foremost over the stop 93 and into the chute 18, down which it slides by gravity. As the ejector finger acts upon the leading bolt in the manner described, it moves in front of the following bolt to hold the latter in the magazine. Upon de-energization of the solenoid 101, the spring 102 restores the parts to their original positions and the succeeding bolt in the magazine moves to the position originally occupied by the discharged bolt. In accordance with the invention the discharge of the bolts from the magazine 75 into the chute may be predetermined so that they will slide down the chute and arrive in the magnetizing coil at the proper time and without the necessity of arresting them in front of the magnetizing coil, the finger 22 and actuating mechanism therefor being thereby rendered unnecessary. The electric circuit for effecting the operation of the machine when the latter includes the automatic feed mechanism described is illustrated in Figure 14 wherein the alternating current supply lines are indicated at 105 and 106. A normally open switch 107 may be momentarily closed to connect relays 108 and 109 across the lines 105 and 106, the relay 108 immediately closing switches 110 and 111. The former connects the solenoid 101 across the lines 105 and 106 while the switch 111 and a normally closed switch 112 establish a holding circuit for the relays 108 and 109. Upon being energized the solenoid 101 will, as has been noted, operate the slide 95 of the ejector mechanism 88 to effect the discharge of a bolt from the magazine 75 into the chute 18. The relay 109, which is delayed acting, is timed so that it will be automatically operative to close a switch 113 when the discharged bolt has entered the magnetizing coil 15. The closing of the switch 113 at such time connects relays 114 and 115 across the supply lines 105 and 106. The relay 114 is thereupon operative to open the switch 112 and thereby break the holding circuit for the relays 108 and 109 and at the same time close switches 116 and 117. The closing of the switch 116 connects the solenoid 57 across the supply lines, thereby closing the switch 58 to energize the magnetizing coil 15 while the switch 117 and a normally closed switch 118 establish a holding circuit for the relays 114 and 115. After the magnetizing coil has been energized for the proper length of time, the relay 115, which is delayed acting, is operative to close a switch 119 and thereby connect relays 120 and 121 across the lines 105 and 106. Upon being energized the relay 120 opens the switch 118 to break the holding circuit for the relays 114 and 115 and at the same time closes a switch 122. The latter and a normally closed switch 123 establish a holding circuit for the relays 120 and 121. The relay 121 which is delayed acting, determines the interval between the time the magnetizing coil 15 is deenergized and the time the ejecting mechanism is actuated to effect the discharge of another bolt from the magazine. After such interval has elapsed the relay 121 is operative to close a switch 124 and thereby connect a relay 125 across the lines 105 and 106. When energized the relay 125 opens the switch 123 to break the holding circuit for the relays 120 and 121, first, however closing a switch 126 to connect relays 108 and 109 across the current supply lines around the switch 107. The cycle of operations described, therefore, is started anew and will be repeated so long as the switch 70 remains closed.

From the foregoing, it will be apparent that the machine has the advantage that the parts are tested rapidly and clearly marked in such a manner that any faults will be clearly indicated. The machine has the further advantage that it may be readily adapted to test parts of various sizes and shapes, the testing of headed bolts as described and illustrated being intended by way of example only, and not limitation.

I claim as my invention:

1. A machine for testing parts magnetically including means for applying a magnetically sensitive film to said parts, a magnetizing coil, means for directing said parts to said means for applying a magnetically sensitive film and then through said coil, and means for momentarily energizing said coil for arresting said parts in said coil, whereby to utilize the magnetic field set up by the latter to modify the film on those of said parts which are defective.

2. A machine for testing parts magnetically including means for applying a magnetically sensitive film to said parts, a magnetizing coil, non-magnetic means for directing said parts past said film applying means and then through said coil, and means for momentarily energizing said coil for arresting said parts within said coil, whereby to utilize the magnetic field set up by the latter to modify the film on those of said parts which are defective.

3. A machine for testing parts magnetically including means for applying a magnetically sensitive film to said parts, a magnetizing coil, a non-magnetic chute extending past said film applying means and through said coil and down which said parts slide by gravity, and means for momentarily energizing said coil for arresting said parts within said coil, whereby to utilize the magnetic field set up by the latter to modify the film on those of said parts which are defective.

4. A machine for testing parts magnetically including means for applying a magnetically sensitive film to said parts, a magnetizing coil, a chute extending past said film applying means and then through said coil and down which said parts slide by gravity, means for momentarily arresting said parts in front of said coil adjacent said film applying means, and means for momentarily energizing said coil for arresting said parts within said coil, whereby to utilize the magnetic field set up by the latter to modify the film on those of said parts which are defective.

5. A machine for testing parts magnetically including a magnetizing coil, a chute extending through said coil and down which said parts slide by gravity, spray means over said chute in advance of said coil for applying a magnetically sensitive film to said parts, means for momentarily arresting said parts under said spray means, and means for energizing said coil for thereafter arresting said parts momentarily within said coil, whereby to utilize the magnetic field set up by the latter to modify the film on those of said parts which are defective.

6. A machine for testing parts magnetically including means for applying a magnetically sensitive film to said parts, a magnetizing coil, a chute so arranged that said parts may move therealong by gravity, said chute extending past said film applying means and through said coil, means for arresting said parts in advance of said coil adjacent said film applying means and for releasing them at predetermined intervals, means for energizing said coil to set up a magnetic field which will arrest the parts in the chute at a point within the coil and which will modify the film on those of said parts which are defective, and means for deenergizing said coil to release the parts arrested by the latter.

7. A machine for testing parts magnetically including means for applying a magnetically sensitive film to said parts, a magnetizing coil, a non-magnetic chute so arranged that said parts may move therealong by gravity, said chute extending past said film applying means and through said coil, means for momentarily arresting said parts in advance of said coil adjacent said film applying means, means for energizing said coil to set up a magnetic field which will arrest the parts in the chute at a point within said coil and which will modify the film on those of said parts which are defective, and means for deenergizing sail coil to release the parts arrested by the latter.

8. Apparatus for testing parts magnetically comprising: conveying means including a chute and means for releasing such parts adjacent the upper end of the chute for movement down the latter by gravity to an inspection station at the bottom of the chute, electro-magnetic means adjacent the chute for creating a magnetic field capable of arresting such movement of the parts between the upper and lower ends of the chute, means for energizing and then de-energizing the electro-magnetic means in predetermined time relationship to operation of the release means whereby the parts passing down the chute will be arrested by the magnetic field and then will be released by collapse of such field for continued movement by gravity to the inspection station, and means for applying a coating of magnetically sensitive material to the parts before such arrest thereof by said magnetic field whereby the latter is utilized to modify the magnetically sensitive coating to indicate defects in the parts.

ALBERT J. NEWMAN.

REFERENCES CITED

The following references are of record in the file of this patent:

UNITED STATES PATENTS

| Number | Name | Date |
| --- | --- | --- |
| Re. 19,611 | De Forest | June 18, 1935 |
| 1,103,358 | Hess | July 14, 1914 |
| 1,555,910 | Chester | Oct. 6, 1925 |
| 1,663,539 | Bellinger | Mar. 27, 1928 |
| 1,758,268 | Wagner | May 13, 1930 |
| 1,897,731 | Manegold | Feb. 14, 1933 |
| 1,983,388 | Moore | Dec. 4, 1934 |
| 2,011,408 | Jacobs | Aug. 13, 1935 |
| 2,057,091 | Eurich et al. | Oct. 13, 1936 |
| 2,234,456 | Schaurte et al. | May 11, 1941 |
| 2,357,512 | Gaiser | Sept. 5, 1944 |

FOREIGN PATENTS

| Number | Country | Date |
| --- | --- | --- |
| 91,441 | Sweden | Feb. 10, 1938 |